United States Patent [19]

Lanner et al.

[11] Patent Number: 4,524,721

[45] Date of Patent: Jun. 25, 1985

[54] ANIMAL CAGE INSERT AND CONVERTIBLE ANIMAL CAGE

[75] Inventors: Michael Lanner, Stoughton; Cynthia L. Coffey, Wayland, both of Mass.

[73] Assignee: The Beth Israel Hospital Association, Boston, Mass.

[21] Appl. No.: 586,273

[22] Filed: Mar. 5, 1984

[51] Int. Cl.³ .............................................. A01K 31/06
[52] U.S. Cl. .................................................... 119/17
[58] Field of Search ..................................... 119/17–19, 119/28, 22, 48, 45

[56] References Cited

U.S. PATENT DOCUMENTS 3,721,213  3/1973  Bruggeman .
3,726,255  4/1973  Marr .
4,046,107  9/1977  Kuster ...................................... 119/17

FOREIGN PATENT DOCUMENTS 400462  10/1933  United Kingdom .................. 119/17

Primary Examiner—Jay N. Eskovitz
Attorney, Agent, or Firm—Anthony M. Lorusso

[57] ABSTRACT

A convertible animal cage particularly suited for use in laboratories utilizing more than one kind of small rodent to minimize storage area and cage inventories. In one embodiment, a standard hanging cage with a relatively large grid bottom and front is converted into a cage for smaller animals by the insertion of an L-shaped piece consisting of a smaller grid. In another embodiment, the front and bottom panels of an otherwise solid cage are replaced with panels of a different size grid.

1 Claim, 14 Drawing Figures

ANIMAL CAGE INSERT AND CONVERTIBLE ANIMAL CAGE

BACKGROUND OF THE INVENTION

The confinement of animals by various means extends back to prehistoric times. As man has developed more specialized needs and varieties of animals, the means for their care has also evolved.

The maintenance of domestic animals in racks of cages is of relatively recent origin. Techniques and apparatus have been primarily aimed at the needs of poultry, particularly chickens. For example, U.S. Pat. Nos. 3,726,255 to Marr and 4,046,107 to Kuster disclose cages designed to prevent such problems as breast blisters, swollen hocks, and snagged toes and feet in caged poultry. The U.S. Pat. No. 3,726,255 patent teaches a method for preventing the breast and hock abrasions of chickens by the use of a resilient mat placed over the standard cage floor. The U.S. Pat. No. 4,046,107 patent teaches the use of a movable panel of small grid size placed over the regular floor of the cage to prevent the chickens feet from slipping through the cage.

A problem with both inserts is that the waste material no longer freely falls through the cage floor. In the case of the mat, resilient motion helps the material pass through the openings. In the design using a hard insert, the floor is bracketed so that the movement of the chicken pushes the two pieces together to help force the waste material through the smaller grid.

Developments over the last twenty to thirty years in science and industry has promoted the keeping of animals other than poultry in racks of cages. These animals are primarily small mammals such as rabbits, rats, hamsters, guinea pigs, and mice.

The majority of cages for these animals are of standard construction, with four sides, one of which is a door, a top, and a bottom which allows the waste material to pass through onto a collection pan. An example of such a cage where the panels disassemble for storage in U.S. Pat. No. 3,721,213 to Bruggeman.

Due to the distinctive demands of laboratory work, cages have been further specialized so that they provide for the animal's comfort, are easily cleaned and sterilized, and can be uniformly positioned on storage racks to provide the maximum number of cages in the available space while maintaining adequate ventilation and spacing necessary to prevent the spread of disease.

The most common way to prevent the spread of disease through contact of the animals while insuring adequate ventilation is to design the cage with an open or a solid top, three solid side walls, and an open grided front wall. The bottom must necessarily be an open grid to allow the waste material to pass onto the collection tray below. Open topped hanging cages that slide into brackets mounted on the underside of shelves on the racks have the advantage that they do not require doors since the underside of the shelf serves as a solid barrier (or top) for the animal cage and access to the cage is easily provided by sliding the cage out from the rack to expose the open top. This allows the food and water containers to be directly mounted on the front, open grided panel for maximum utilization of area at a minimum cost.

A drawback to these cages is that, due to economic considerations, they are constructed out of a single sheet of metal to which a grid is attached at the front and on the bottom. Not only do the cages not come apart for storage, but they can only be used for one variety of animal, for example a rat, and not another animal of a different size, for example a mouse. The mouse could escape through or be injured by the larger grid used for containing a rat, and the waste material of the larger animal, the rat, would not go through the smaller grid used for a mouse.

As a consequence, cages of each grid size must be inventoried so that the required cage size is available when needed. This is expensive because extra cages must be purchased and because the extra cages must be stored when not in use.

It is therefore a principal object of the present invention to provide a cage which is convertible for use with more than one variety or size of animal.

Another object of the invention is that the means of conversion not alter the size or ability of the cage to be cleaned and sterilized.

Yet another object of the present invention is that the means of conversion is simple, inexpensive, reliable and can be stored in a relatively small area.

A still further objective of the present invention is that it not be detrimental to the health and welfare of the caged animal.

SUMMARY OF THE INVENTION

The present invention is a convertible animal cage wherein the grid size of the front and bottom panels is changed to accommodate different size animals. The remainder of the cage is utilized without alteration.

In one embodiment, a cage with a relatively large grid bottom and front is converted into a cage for a smaller animal by the insertion of an L-shaped piece consisting of a smaller grid. In another embodiment, the front and bottom panels are removed and panels of a different grid size inserted.

These and other features and objects of the invention will become apparent to those skilled in the art from the following detailed description which should be read in light of the accompanying drawings.

DETAILED DESCRIPTION OF THE INVENTION

Figure 2:
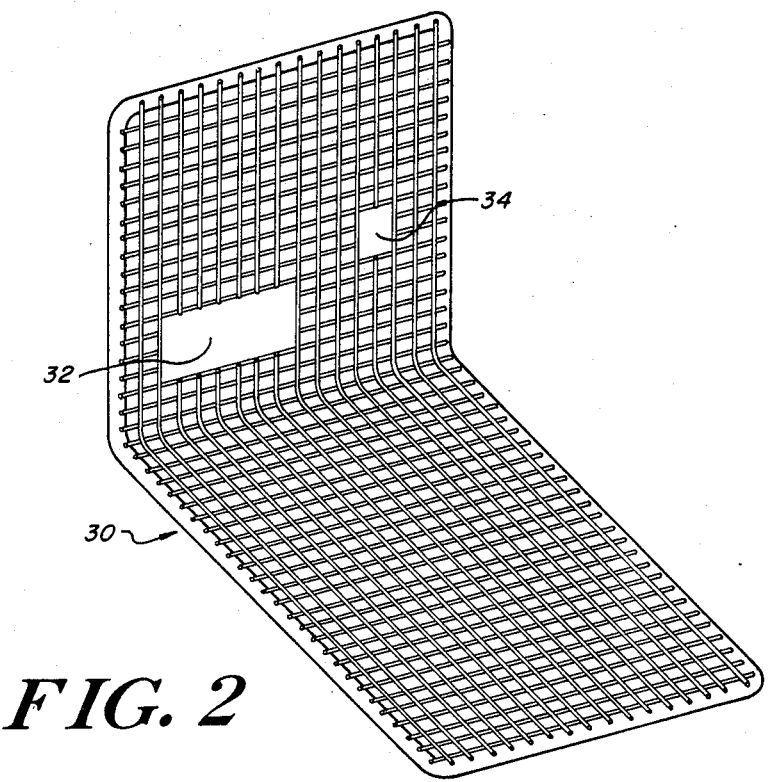
FIG. 2 is a perspective of an L-shaped insert of a smaller grid size for placement inside the cage shown in FIG. 1.
Figure 1:
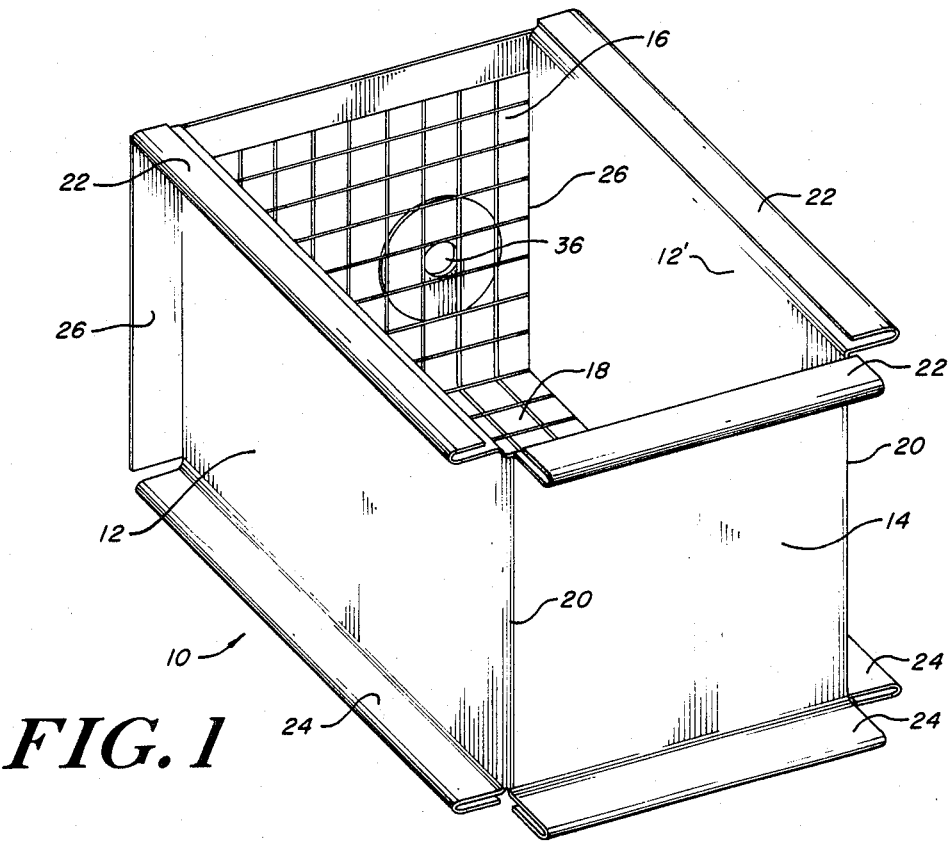
FIG. 1 is a perspective view of a standard hanging rat cage with a solid back and sides, a large grid front and bottom, and an open top.

One embodiment of the present invention is shown in FIGS. 1-5. In this embodiment, an animal cage 10 consists of two solid sides 12 and 12', a solid back 14, and an open grid front 16 and bottom 18. The sides 12 and 12' and back 14 are constructed from a single sheet of metal, such as stainless steel, which is bent at each corner 20 to form the three solid sides, 12 and 12' and 14. Slits are made at the corners 20, then the upper 22 and lower edges 24 are bent out and folded over, to form edges at right angles to the back and sides. The upper edges 24 along the sides 12 and 12' slide into brackets on the bottom of shelves which are layered to form multishelf racks. Multiple cages 10 can be hung along the length of the shelves. The front edges 26 of the metal sides are also bent out and folded over. The front edge 26 and bottom edges 24 form clamps to hold a piece of open grid in place on the front 16 and on the bottom 18.

Figure 3:
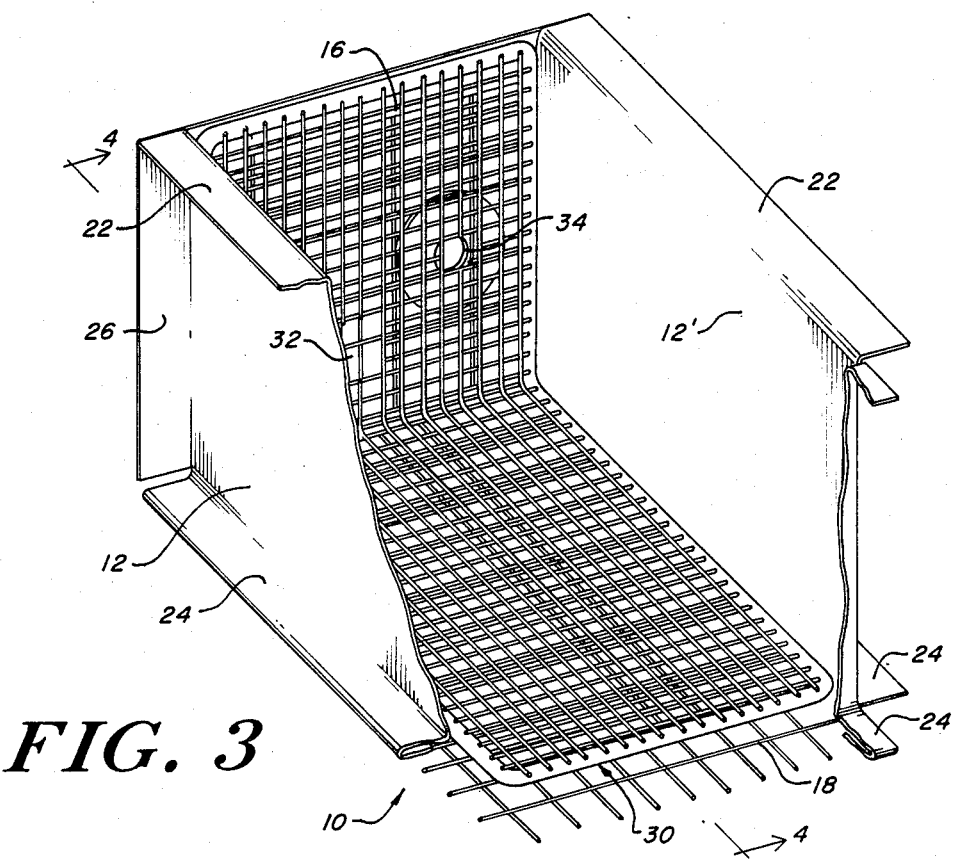
FIG. 3 is a sectional view of the cage of FIG. 1 with the insert of FIG. 2 in place.
Figure 4:
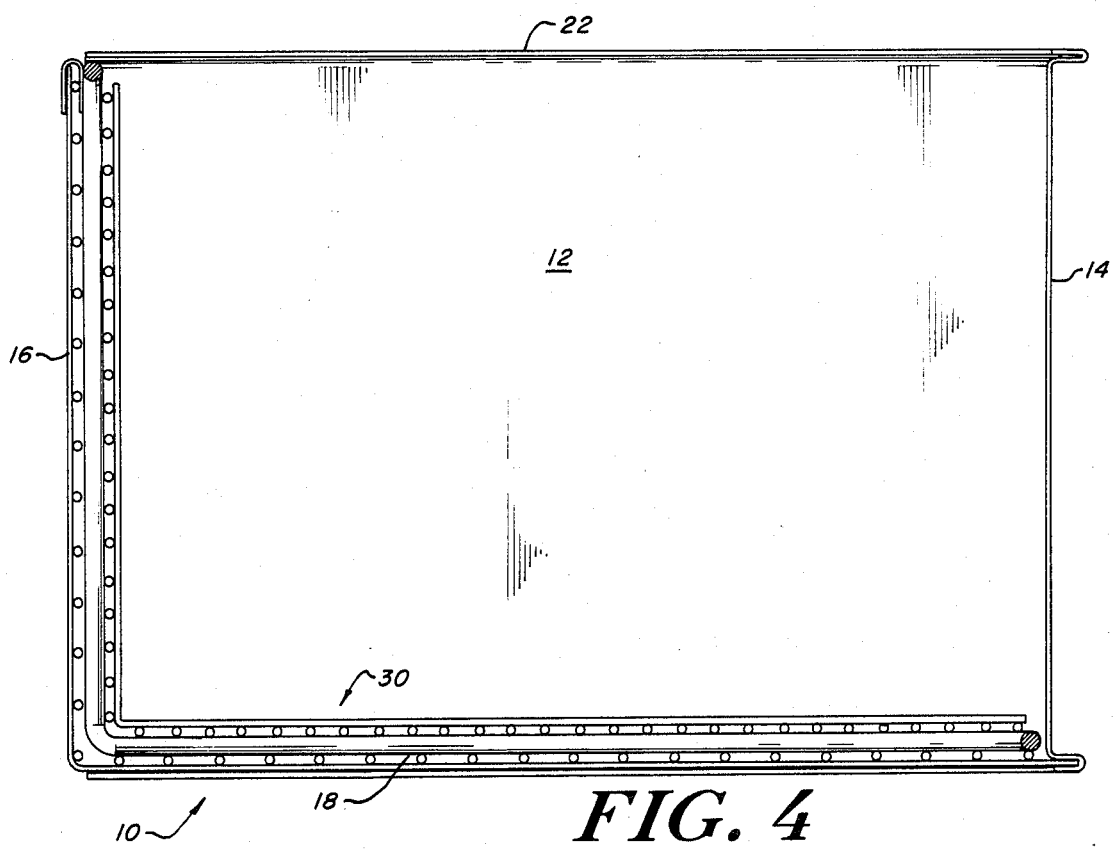
FIG. 4 is a cross-sectional view of the insert and cage shown in FIG. 3 taken along line 4—4 of FIG. 3.

An L-shaped insert 30, shown in FIG. 2, is placed inside the cage 10 of a larger animal, such as a rat, to convert the cage 10 into a cage for a smaller animal, such as a mouse. The cage 10 with the insert 30 is shown in FIG. 3. A sectional view of the insert within the cage is shown in FIG. 4. The grid size of the insert 30, is smaller than the grid size of the bottom 18 and front 16 of the cage 10. For example, a grid opening of 121 m$^2$ in area, plus or minus 10%, is used for a rat and a grid opening of 49 m$^2$ in area, plus or minus 10%, is used for a mouse. There is an opening 32 in the grid for access to the food and an opening 34 for the water bottle.

Figure 5:
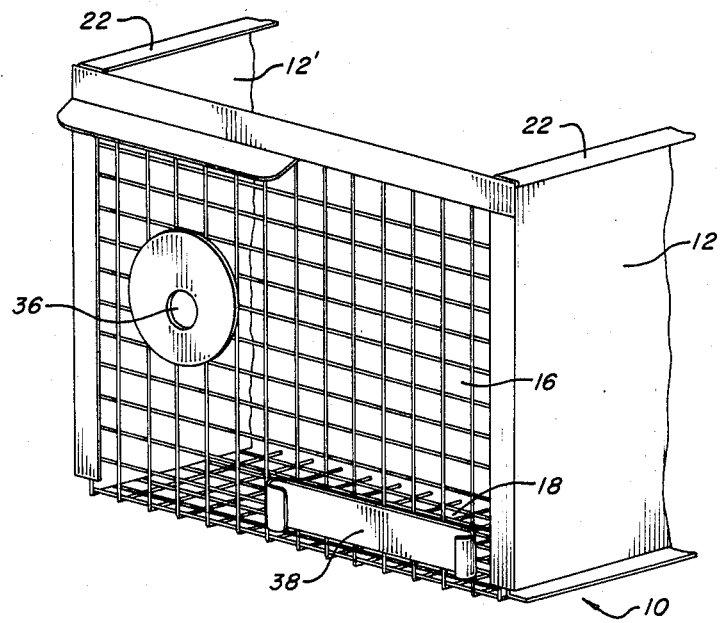
FIG. 5 is a plain front view of the cage shown in FIG. 1 with brackets for the food and water containers.
Figure 5A:
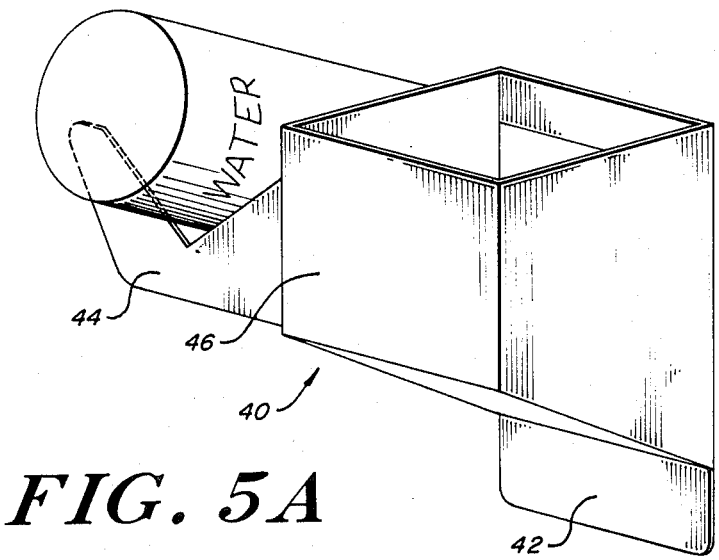
FIG. 5A is a plain front view of a feed container-water bottle bracket combination which attaches to the front of the cage as shown in FIG. 5.

FIG. 5 shows the front of the cage 10 with the water bottle opening 36 and bracket 38 for holding the food container-water bottle bracket 40 shown in FIG. 5A. The lower piece 42 on the food container 40 slips into the bracket 40 on the cage 10, securing the container 40 next to the cage. A bracket 40 projects perpendicularly outward from the food container box 46 to hold a water bottle. The water bottle outlet enters the cage 10 through the opening 36.

A second embodiment of the invention is shown in FIGS. 6-9. In this embodiment the front and bottom gridded panels of the cage are replaced with the appropriate grid size for the animal being confined in the cage. A solid bottom panel may be used with a front gridded panel if the animal to be contained, such as a hamster, prefers nesting material to an open floor.

Figure 6:
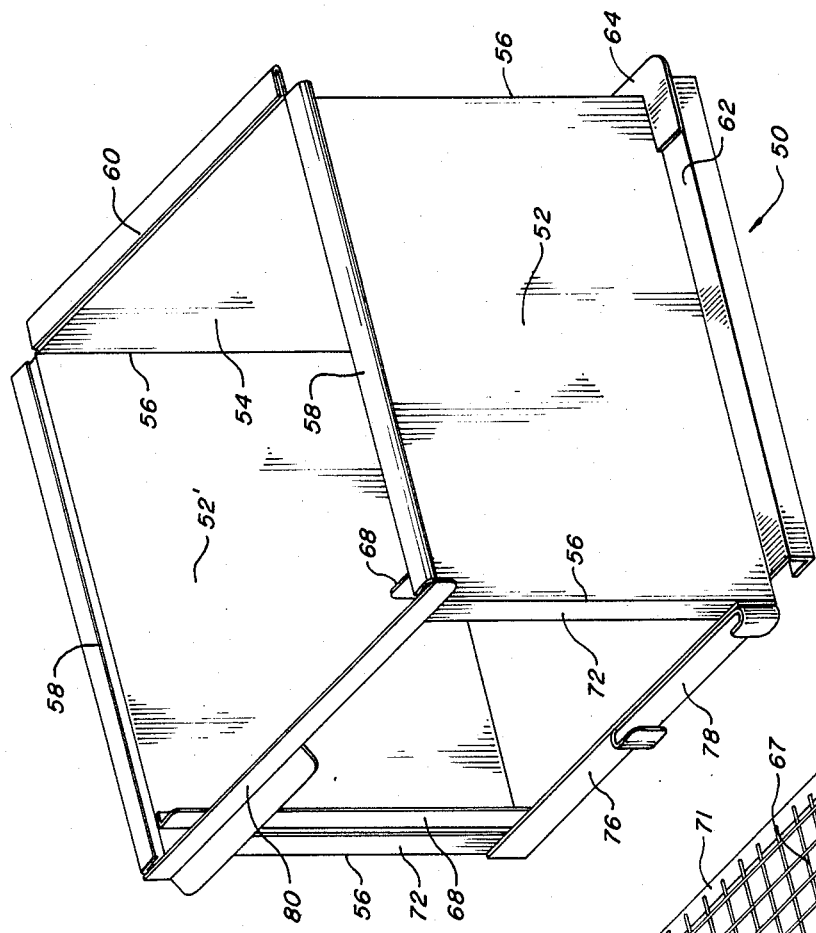
FIG. 6 is a plain view of a hanging rat cage with front and bottom panels removed.
Figure 6A:
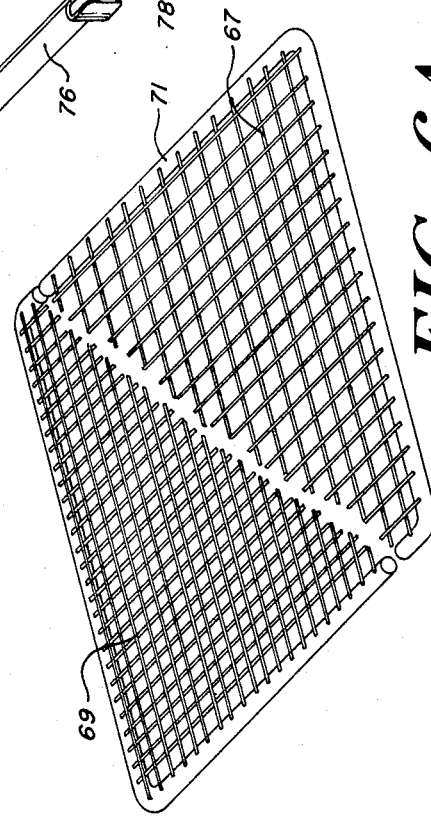
FIG. 6A is a composite view of the bottom panel, with two different grid sizes, for the cage shown in FIG. 6.
Figure 6B:
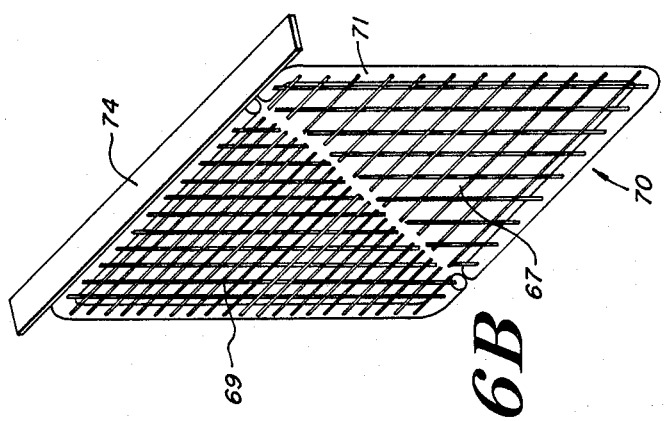
FIG. 6B is a composite view of the front panel, with two different grid sizes, for the cage shown in FIG. 6.

The basic cage 50 is shown in FIG. 6. The cage 50 consists of two solid sides 52 and 52' and a solid back 54. As with the first embodiment, a solid sheet of metal is bent at the corners 56 to form the sides 52 and 52' and back 54. The metal is split at the top and bottom of the corners 56, and the top of the sides 52 and 52' and back 54 bent out and back over to form edges 58 and 60 perpendicular to the sides 52 and 52' and back 54. The upper edges 58 slide into brackets on the bottom of the shelves in multiple shelf racks to hold the cages up against the undersides of the shelves. The lower edges 62 and 64 of the sides 52 and 52' and back 54 are also bent out, down, and under to form a means for holding the botom panel 66 shown in FIG. 6A. Pieces of metal 68, bent to form right angles, are affixed to the inside of the sides 52 to hold the front panel 70. The panel 70 slides between these pieces 68 and the front edges 72. The panel 70 is prevented from falling out of the cage 50 by means of a flat piece 74 of metal welded to the top of the front panel 70. The front panel 70 protrudes in front of the bottom panel 66 so that the bottom panel 66 is locked inside of the cage 50. Two panel grid sizes 67 and 69, one for use with rats and having an opening of approximately 121 m$^2$ in area, and one for use with mice and having an opening of approximately 49 m$^2$ in area, are shown in FIGS. 6A and 6B. As shown in the figures, the panels 66 and 70 consist of either open grid 67 or 69 on a round metal frame 71.

Figure 7:
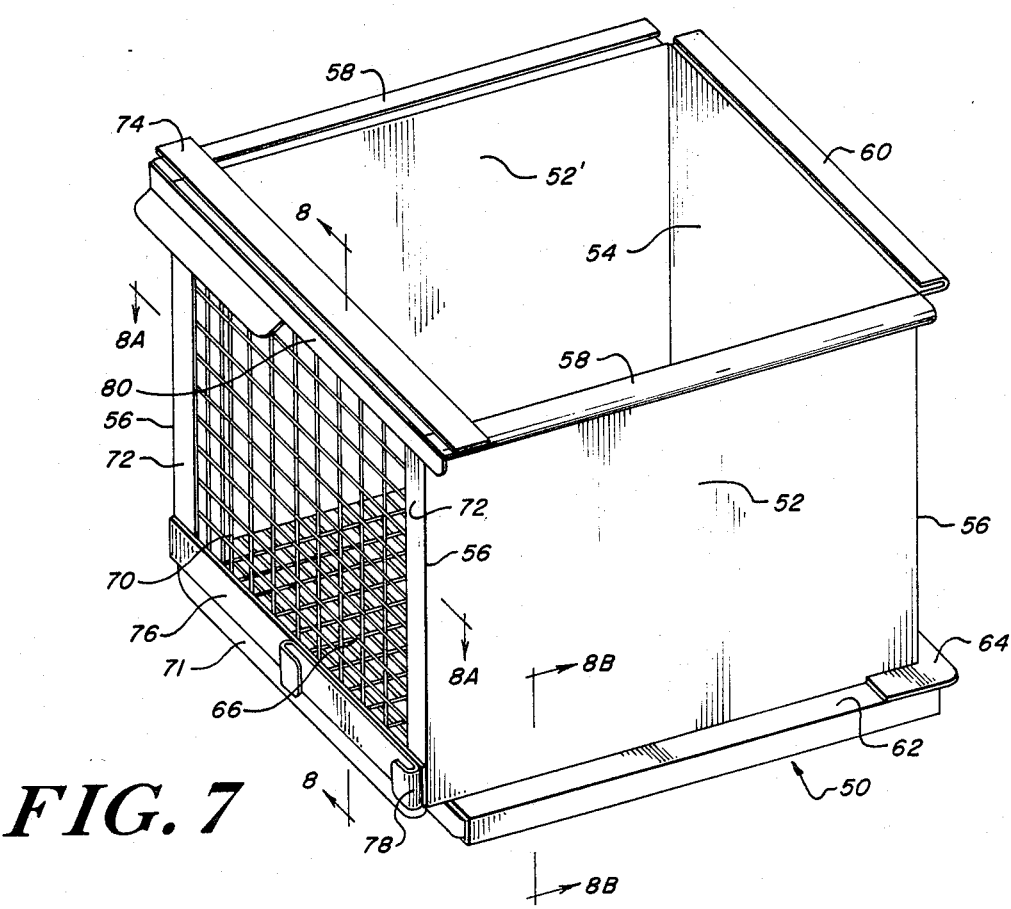
FIG. 7 is a perspective view of the cage shown in FIG. 6 with the bottom and front panels in place.

The completely assembled cage 50 is shown in FIG. 7. The bottom panel 66 slides into the bracket formed by the lower edges 62 and 64 and is then held in place by the panel 66 which is slid in between the pieces 68 and the edges 72 at a right angle to the bottom panel 66.

A strip 76 of metal is welded across the front of the cage 50 to hold a bracket 78 to secure the food container 40 by means of the piece 42 at the bottom of the box 46. No openings in the front panel are necessary since there is only one layer of wire, unlike the first embodiment in which an insert 30 is placed inside the cage 10. A second metal strip 80 secures the top front portion of the cage.

Figure 8:
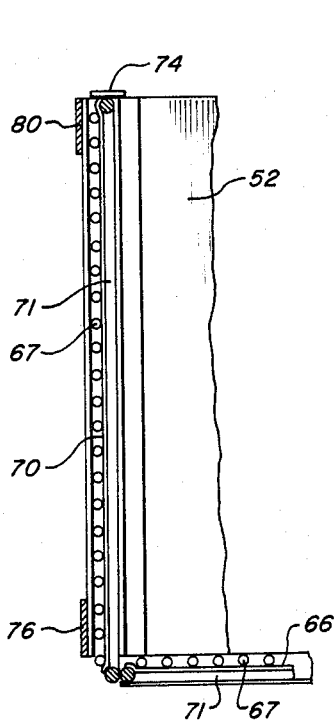
FIG. 8 is a detailed cross-sectional side view of the interface of the front and bottom panels taken along line 8—8 of FIG. 7.
Figure 8A:
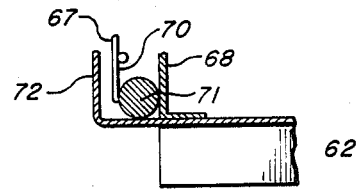
FIG. 8A is a detailed cross-sectional top view of the front panel, in place in the cage, taken along line 8A—8A of FIG. 7.
Figure 8B:
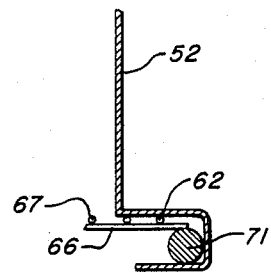
FIG. 8B is a detailed cross-sectional side view of the bottom panel, in place in the cage, taken along line 8B—8B of FIG. 7.
Figure 9:
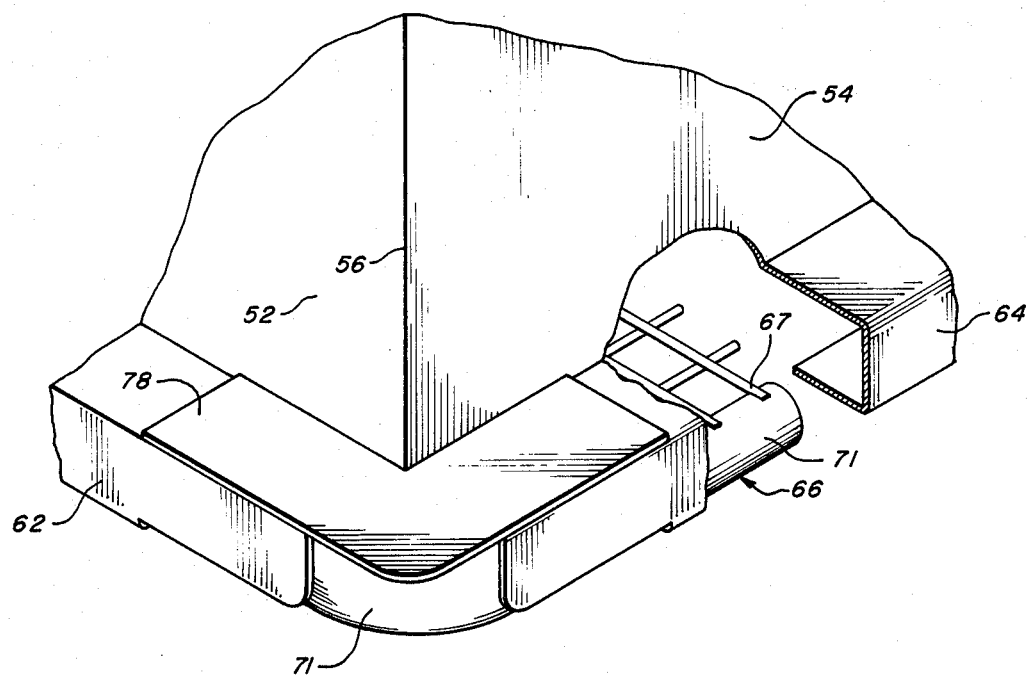
FIG. 9 is a plain view of the bottom panel from the rear of the cage with a portion broken away to show the bottom panel grid.

FIGS. 8, 8A, 8B, and 9 show the actual construction of the panels 66 and 70 and the way they are positioned within the cage 50. The extension of the front panel 70 in front of the bottom panel 66 is best shown in FIG. 8. FIG. 8A shows how the front panel 70 is positioned between the front edge 72 and the right angle piece 68. FIG. 8B shows how the bottom panel 66 fits into the lower side edges 62. FIG. 9 is a view of the bottom rear portion of the cage 50. The bottom panel 66 is held by the side brackets 62 and rear bracket 64. A piece 78 of metal, cut to form a right angle, secures the corners 56.

These and other modifications of the invention will occur to those skilled in the art in the foregoing detailed description and the accompanying drawings. Such modifications are intended to fall within the scope of the appended claims.

What is claimed is:

1. A process for converting a hanging animal cage suitable for use for caging a first animal species to a cage suitable for use as a cage for a second smaller animal species comprising (1) providing a cage having two solid sides and a solid back with an open grid bottom and open grid front wherein said grid size is dimensioned to safely and hygienically contain a first animal species and (2) inserting into the cage an L-shaped grid insert so as to cover the open grid bottom and open grid front, wherein said insert grid size is smaller than the size of the grids provided on the cage and is dimensioned so as to safely and hygienically contain a second smaller animal species.

* * * * *